Nov. 27, 1923.

W. L. KAUFFMAN, 2D 1,475,491

AUTOMOBILE BRAKE CONTROL

Filed Dec. 26, 1922

INVENTOR,
Walter L. Kauffman 2nd
BY
Fay Oberlin & Fay
ATTORNEYS

Patented Nov. 27, 1923.

1,475,491

UNITED STATES PATENT OFFICE.

WALTER L. KAUFFMAN 2D, OF YOUNGSTOWN, OHIO.

AUTOMOBILE-BRAKE CONTROL.

Application filed December 26, 1922. Serial No. 608,846.

*To all whom it may concern:*

Be it known that I, WALTER L. KAUFFMAN, II, a citizen of the United States, and a resident of Youngstown, county of Mahoning and State of Ohio, have invented a new and useful Improvement in Automobile-Brake Controls, of which the following is a specification, the principle of the invention being herein explained and the best mode in which I have contemplated applying that principle, so as to distinguish it from other inventions.

The present device relates to an attachment to or for use in connection with the emergency brake and clutch pedal mechanism of automobiles and is shown as adapted for use on a "Ford" automobile. The object of the present invention is to enlarge the present function of the throw-out cam, which holds the clutch in neutral position when the emergency brake lever is moved to any of its holding positions, by making of this cam a positive ratchet which shall retain the emergency brake lever in any set position. A further object of this invention is the provision of a ratchet which may be installed as an integral part of the brake mechanism when same is first built, or may be readily attached at any time afterward, and which will either supplement or supplant any other ratchet device intended to retain the emergency brake in its "on" or holding positions. A further object is the provision of such positive ratchet device which can only be released by positive actuation of the clutch pedal in the direction of its low-speed engaging position, thus preventing accidental release of the brake and consequent engaging of the high-speed clutch. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figures 1, 2:
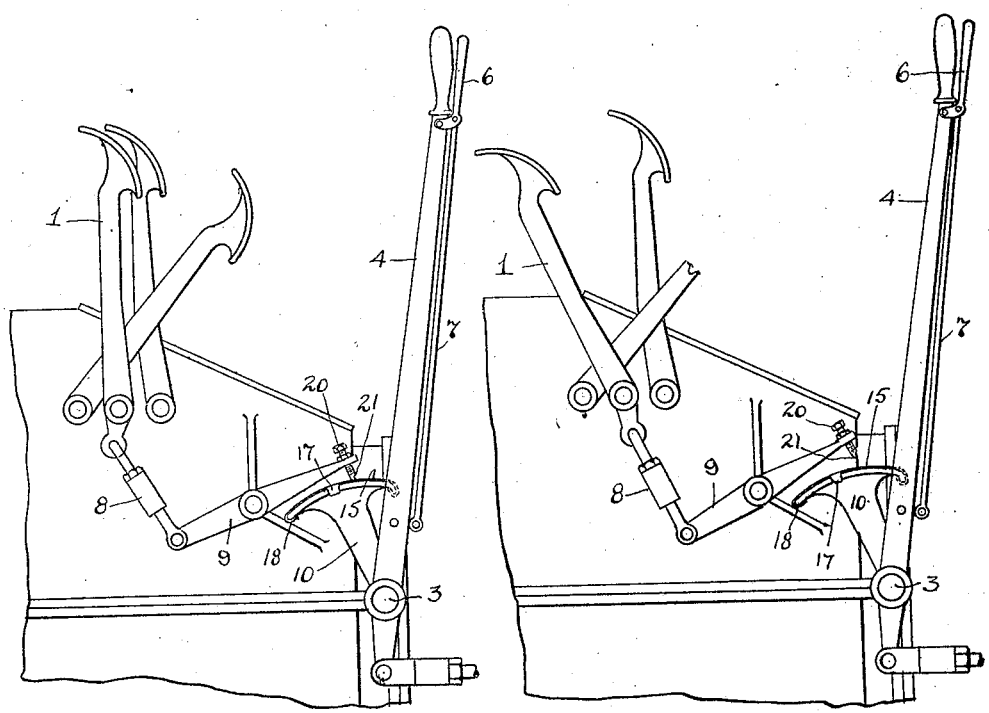
Figure 3:
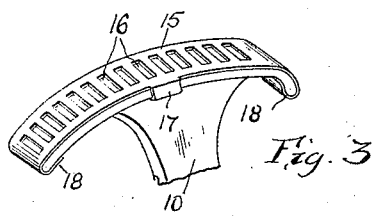
Figure 4:
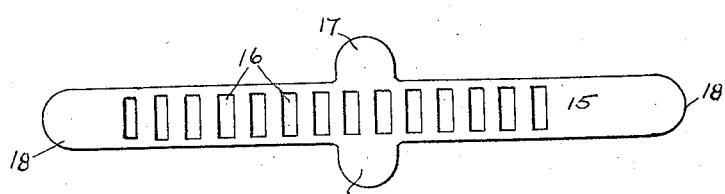

Fig. 1 is a side elevational view of the transmission casing with its associated parts of a Ford automobile with the emergency brake lever and rock shaft set to hold the clutch in its neutral position; Fig. 2 is a view similar to Fig. 1 but showing the clutch pedal depressed to effect release of the emergency brake and rock shaft; Fig. 3 is a perspective view of the cam member; and Fig. 4 is a plan view of the attaching plate for the cam member.

In a Ford automobile there is provided a clutch pedal which is moved forwardly to drive the car at low speed and which springs rearwardly to engage the high speed clutch, this position being its normal one. In the side frame members of the car is mounted a rock shaft 3 which at one side is provided with an upwardly extending emergency brake lever 4 which passes by a notched quadrant, the lever having a pawl operating handle 6 and rod 7, the pawl normally engaging with the quadrant to maintain the lever in any position to which it is moved.

In addition to controlling the action of the emergency brake the lever 4 and shaft 3 are used to hold the clutch pedal 1 in neutral position and for this purpose a curved cam member 10 is secured to the shaft 3 and is movable therewith. To the lower end of the clutch pedal is attached an adjustable link 8 which is pivotally connected at its lower end to one end of a pivotally mounted lever 9. The other end of this lever is provided with a screw or bolt which is mounted in the path of the cam member and is adapted to contact therewith upon movement of the emergency brake lever to move the clutch pedal into its middle or neutral position.

The emergency brake ratchet mechanism wears rather rapidly to the point that it will no longer hold securely and the brake is then apt to wholly or partly release itself, and where the emergency brake mechanism is designed to wholly or partly actuate the clutch mechanism such release will allow the clutch to engage the gears. To obviate this trouble means have been provided to either supplement the brake lever pawl mechanism or preferably to supplant the same and the mechanism is so arranged in conjunction with the cam member as to effect an automatic release of the same, but essentially is a structure designed to furnish a satisfactory positive pawl mechanism for retaining the emergency brake in any of its on or holding positions.

In the preferred form of my device a sheet metal plate 15 is used, the plate being provided with a series of transverse slots 16. This plate is curved to fit the surface of the cam member 10 and is provided with two extending ends 16 adapted to be bent around the cam member 10 to secure the plate thereon. If desired, the plate may be provided with two ears 17 which may be bent down past the sides of the cam member.

In place of the usual screw in the lever 9 an adjusting screw 20 is provided which has a sharpened end preferably with a straight edge and curved sides to the main body of the screw. Such screw 20 is adapted to be mounted with its lower edge in alignment with the transverse slots in the plate so that as the emergency brake lever is moved it will pass over and engage in the slots to hold the emergency brake lever in any position to which it is moved as well as to hold the clutch in its neutral position.

The disengagement of the emergency brake is only obtained by movement of the clutch pedal forwardly toward its low speed position and thus moving the screw 20 upwardly through the link and pivoted lever. This allows the emergency brake lever to move to its normally off position and if desired a spring may be employed to aid in automatically returning the brake lever although this is usually unnecessary.

It is, of course, clear that in place of the plate, I may substitute a new cam member 10 having its cam surface corrugated or formed with grooves, or the plate may be corrugated but the form illustrated is preferable and gives a very positive action inasmuch as the screw is forced into the corrugations by the pressure of the high speed clutch springs. By the use of this attachment the emergency brake is held in its on position or the clutch pedal is held in neutral or both, without fear of accidental disengagement due either to poor pawl and ratchet action on the emergency brake lever or due to accidental movement thereof.

When it is desired to start the machine, it is only necessary to move the clutch pedal into its low speed engaging position which automatically and positively releases the emergency brake and engages the clutch. The entire attachment is simple and economical to manufacture and install as the only parts necessary are the plate for attachment to the cam member and the set screw with the sharpened lower edge. After these are installed the pawl and actuating members on the emergency brake may be removed or locked open, or the quadrant removed as may be easiest.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In an attachment for Ford automobiles, a curved plate member adapted to be mounted on the clutch actuating cam member, said plate being provided with a series of transverse slots; and a sharpened screw adapted to be mounted in the cam engaging arm to engage with such slots in said plate, said screw having its end formed into a narrow edge extending in the same direction as such transverse slots.

2. In a ratchet safety device of the character described, the combination with a clutch pedal and operating link; an emergency brake lever and rock shaft, of a cam having a serrated upper surface attached to and movable with said rock shaft, a cam engaging element carried by said link and adapted upon movement of the brake lever to engage with the serrations on said cam to secure and hold the brake lever in its brake holding position, said brake being released and said cam and engaging element being disengaged only by the movement of said clutch pedal forwardly from its neutral position.

3. In a ratchet safety device of the character described, the combination with an emergency brake lever and rock shaft, of a cam member mounted on said shaft and movable therewith, a clutch pedal having an element adapted to be engaged by the cam upon movement of said brake lever to secure the brake in its holding position until the engaged parts are released by forward movement of said clutch pedal.

4. In a ratchet device of the character described, the combination with a planetary clutch pedal and operating link, an emergency brake lever and rock shaft, and a cam member mounted on said shaft, of a serrated plate adapted to be secured to the surface of said cam member, and a pointed element adapted to be removably mounted in said link to engage with such plate upon movement of said emergency brake lever to secure the brake in its engaged position, said brake being released and said cam and engaging element being adapted to be disengaged only by downward movement of said clutch pedal towards its low speed engaging position.

5. In a ratchet of the character described, the combination with a planetary clutch pedal and operating link, an emergency brake lever and rock shaft, and a cam member mounted on said shaft, of a serrated plate adapted to be secured to the surface of said cam member, and a pointed element adapted to be removably mounted in said link to engage with such plate upon movement of said emergency brake lever to hold the same in its brake engaging position and at the same time to hold said clutch in neutral position, said cam and engaging element being adapted to be disengaged only by downward movement of said clutch pedal out of neutral position to allow said emergency brake to be disengaged only by movement of the clutch pedal towards its low speed operating position.

6. In an attachment for Ford automobiles, a curved plate member adapted to be mounted on the clutch actuating cam member, said plate being provided with a series of transverse slots, and a sharpened screw adapted to be mounted in the cam engaging arm to engage with such slots in said plate.

7. In a ratchet device for "Ford" automobiles, the combination with the low-speed clutch pedal and operating link; an emergency brake lever and rock shaft, of a cam having a serrated surface and being attached to or movable with said rock shaft, a cam engaging element carried by said link and adapted upon movement of the brake lever to engage with the serrations on said cam to secure and hold the brake lever in any of its brake holding positions engaged only by the movement of said clutch pedal forwardly from its neutral position.

Signed by me this 16th day of December, 1922.

WALTER L. KAUFFMAN, II.